Patented Sept. 11, 1928.

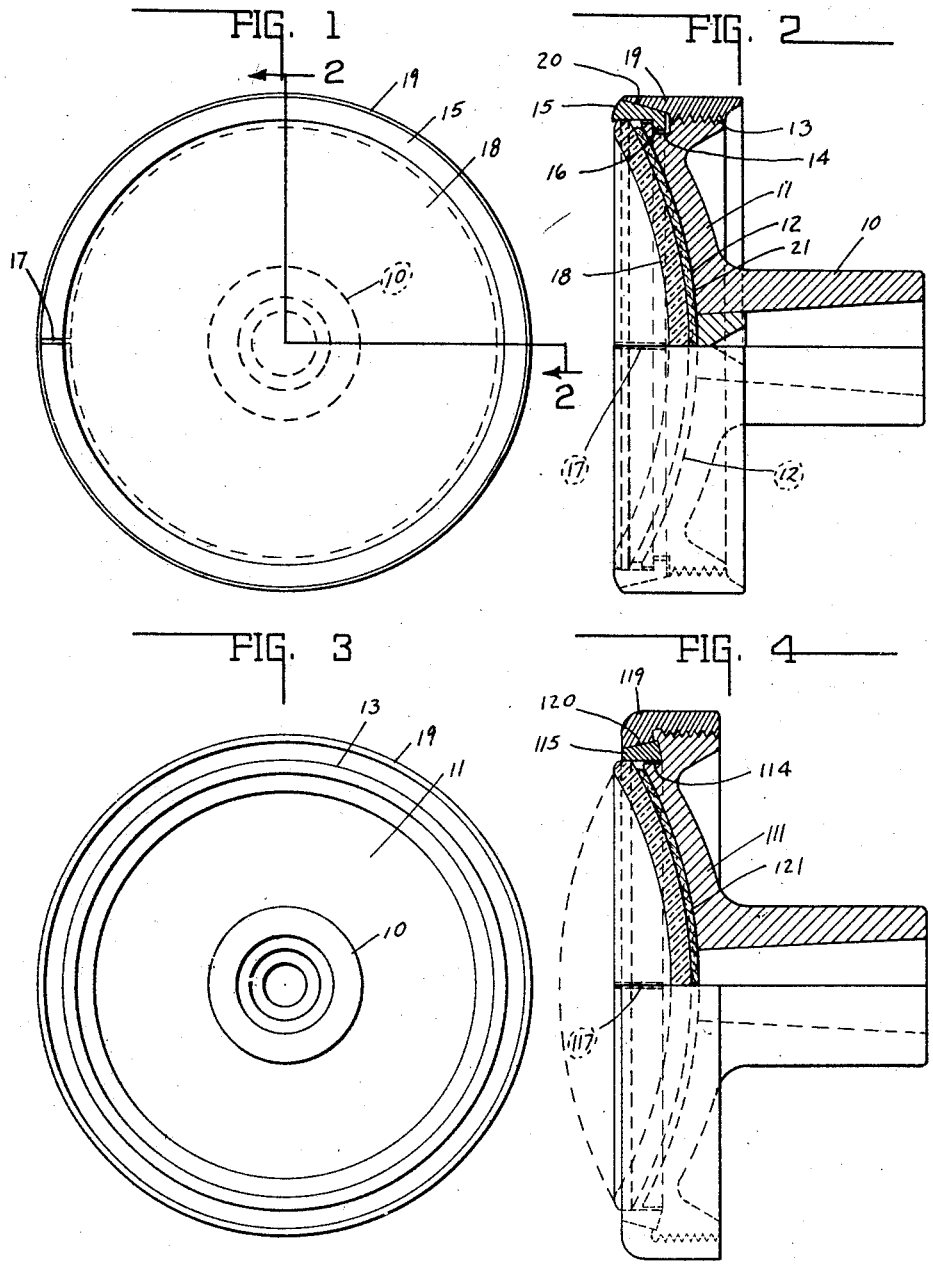

1,683,712

UNITED STATES PATENT OFFICE.

CHARLES C. CLARK, OF INDIANAPOLIS, INDIANA, ASSIGNOR TO CONTINENTAL OPTICAL CORPORATION, OF NEW YORK, N. Y., A CORPORATION.

HOLDER FOR OPTICAL LENSES.

Application filed April 29, 1927. Serial No. 187,455.

This invention pertains to a holding device for optical lenses, particularly adapted for use in grinding and polishing.

In the manufacture of optical lenses, it is necessary to grind and polish them, and the usual method employed is to mount a lens holder on a spindle properly centered and positioned, so as to have relative rotary motion between the lens and the grinding or polishing button. As the lenses are generally concavo convex, the face of the holder is annular and concave in form for receiving the convex surface of the lens to be ground, or, on the other hand, the face of the holder may be convex to receive the concave surface of the lens. It has heretofore been customary to secure the surface of the lens to the surface of the holder by an adhesive, such as pitch. However, certain disadvantages are inherent in that method, since it takes some time to remove the lens from the holder after the final operation, thus tying up a number of holders as well as a loss of time by the operators. Furthermore, in securing the lens to the holder by the use of pitch, the proper centering of the lens is not always possible. There is no means provided for centering the lens and wherein its axis is slightly off center of the axis of rotation, the grinding and polishing of different optical surfaces will vary correspondingly, whereby upon the lens being cut into blanks, some will be too small and others over size.

The object of this invention is to provide a simple mechanical means for quickly securing and permitting the ready removal of the lens to the holder and at the same time accurately center the lens thereon. This is accomplished by means of an expansible clamping ring mounted about the periphery of the holder having a screw collar fitting thereover for wedging the ring in a clamping position about the peripheral edge of the lens in such manner as to grip the same and hold it securely and firmly against the surface of the holder and causing its peripheral edge to register with the peripheral edge of the holder, thus properly centering it in place. By this means the lens may be rigidly mounted on or removed from the holder by giving a turn to the clamping collar.

The full nature of the invention will be understood from the accompanying drawings and the following description and claims:

In the drawings, Figure 1 is a front elevation showing a lens mounted on the holder. Fig. 2 is a section taken on the line 2—2 of Fig. 1. Fig. 3 is a rear elevation of the holder. Fig. 4 is the same as Fig. 2 showing a modified form.

In the drawings there is shown a holder comprising a spindle receiving hub 10 having an annular body portion 11 provided with a concave lens receiving face 12. The periphery of the body portion has the rear part thereof provided with screw threads 13 and an annular groove 14 immediately forward thereof.

Removably mounted adjacent the forward edge of the body portion 11 there is a split clamping ring 15, said ring having an annular flange or projection 16 adapted to fit in the groove 14 so as to be maintained in position about the body portion 11. The ring is split at 17 and is sufficiently resilient to permit it to be contracted under spring tension, although normally maintaining its expanded position. The forward edge of the ring 15 extends beyond the forward edge of the body 11 in position to engage the peripheral edge of a lens 18 to be secured thereby. Said lens is adapted to fit snugly against the concave surface 12 of the body portion within the ring 15.

For compressing the ring into clamping position, there is provided an internally screw threaded collar 19 adapted to screw on the threads 13 of the body 11 from the rear of the holder toward the front face thereof. Said collar is formed with an inner beveled surface 20 adapted to engage and slide over a corresponding externally beveled surface on the ring 15, said beveled surfaces being so inclined with respect to each other that the collar exerts a wedging action on the ring for contracting it into clamping position against the lens. By reason of the tension of the ring, as before mentioned, upon the collar being moved rearwardly out of wedging engagement, the spring tension of the ring will cause it to expand so as to release the lens.

From the foregoing, it will be apparent that when the collar 19 is screwed rearwardly, the relative positions of the wedging surfaces between the collar and ring will be such as to permit the normal expansion of the ring, whereby the lens 18 may be readily positioned against the surface 12 of the holder. Thereupon the collar is screwed forwardly so that the wedging surfaces will contract the ring and force it against the peripheral edge of the lens for clamping and securing the lens in place as well as centering it with respect to the holder. Upon the completion of the grinding and polishing operation, the lens may be readily removed from the holder by merely screwing the collar slightly rearwardly, sufficiently to permit slight expansion of the ring 15 so that it will release the lens and permit it to drop from the holder. If desired, a black cloth cushion or the like may be positioned between the surface of the body portion and the lens for protecting the latter and giving a suitable background for inspection purposes.

In the modified form shown in Fig. 4, the mounting of the collar is reversed. As therein shown, the body portion 111 has no recess or groove 14, the ring 115 being mounted about an annular shoulder 114. The ring 115 is provided with an external tapering surface opposite to the ring 15 which is engaged by an inwardly-extending tapering surface 120 of the collar 119 so that the ring is contracted to clamping position by screwing the collar rearwardly from the front face of the holder instead of forwardly, as above mentioned. On the other hand, the ring is released by screwing the collar forwardly instead of rearwardly. The principal difference between the modified form and that above described is that the first-mentioned collar is screwed onto the holder from the rear, whereas the modified form is screwed on from the front face of the holder.

Whereas the invention has been described as pertaining particularly to a holder for lenses during their grinding and polishing operation, it is obvious that it may be used in many other operations wherein it is desired to temporarily secure an annular lens to a holder. Also in this connection the lens may be secured in reverse position, as indicated by dotted lines in Fig. 4.

The invention claimed is:

1. A holder for optical lenses comprising an annular body adapted to receive an annular lens, said body being provided with an annular groove extending about the periphery thereof, a clamping ring positioned about the periphery of said body in position to engage and clamp the peripheral edge of said lens and having a flange extending into said groove for retaining said clamping ring on said body, and a collar rotatably mounted on said body in position to engage said clamping ring and contract it into clamping engagement when moved in one direction and releasing it from clamping engagement when moved in the opposite direction.

2. A holder for optical lenses comprising an annular body having a concave lens receiving face adapted to receive an annular concavo convex lens thereon, said body having an annular groove formed about the periphery thereof, a resilient split clamping ring positioned about the periphery of said body in position to engage and clamp the peripheral edge of the lens, a flange formed on said ring extending into said groove, and a screw threaded collar adapted to screw onto the periphery of said body, said collar and ring having oppositely disposed beveled engaging surfaces, whereby said collar will wedge said ring into clamping engagement when screwed in one direction and will release said ring from clamping engagement when screwed in the opposite direction.

In witness whereof, I have hereunto affixed my signature.

CHARLES C. CLARK.